US006782871B2

(12) United States Patent
McIntyre et al.

(10) Patent No.: US 6,782,871 B2
(45) Date of Patent: Aug. 31, 2004

(54) FUEL SYSTEM INCLUDING A FLOW-THROUGH PRESSURE REGULATOR

(75) Inventors: Brian Clay McIntyre, Suffolk, VA (US); James Archie Wynn, Jr., Virginia Beach, VA (US); Barry Robinson, Williamsburg, VA (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 0 days.

(21) Appl. No.: 10/455,610

(22) Filed: Jun. 6, 2003

(65) Prior Publication Data

US 2003/0226546 A1 Dec. 11, 2003

Related U.S. Application Data

(60) Provisional application No. 60/386,535, filed on Jun. 6, 2002.

(51) Int. Cl.[7] .......................... G05D 16/08; F02M 37/04

(52) U.S. Cl. ........................ 123/457; 123/506; 123/511; 123/514; 137/510; 137/505.25

(58) Field of Search ................................ 123/463, 457, 123/506, 510, 511, 514; 137/510, 505.25

(56) References Cited

U.S. PATENT DOCUMENTS

| | | | | |
|---|---|---|---|---|
| 2,603,231 A | | 7/1952 | Birkemeier | 137/218 |
| 2,618,290 A | | 11/1952 | Van Vliet | 137/510 |
| 4,660,597 A | | 4/1987 | Cowles | 137/505.42 |
| 5,265,644 A | | 11/1993 | Tuckey | 137/510 |
| 5,435,345 A | | 7/1995 | Robinson et al. | 137/508 |
| 5,842,455 A | * | 12/1998 | Tuckey et al. | 123/514 |
| 5,873,349 A | * | 2/1999 | Tuckey et al. | 123/514 |
| 5,901,742 A | | 5/1999 | Kleppner et al. | 137/508 |
| 5,975,061 A | * | 11/1999 | Briggs et al. | 123/514 |
| 5,979,409 A | | 11/1999 | Robinson | 123/463 |
| 6,016,831 A | | 1/2000 | Bueser et al. | 137/315 |
| 6,039,030 A | | 3/2000 | Robinson et al. | 123/457 |
| 6,269,828 B1 | * | 8/2001 | Kilgore et al. | 137/14 |
| 6,286,486 B1 | * | 9/2001 | Robinson et al. | 123/457 |
| 6,318,405 B1 | * | 11/2001 | Brandt et al. | 137/484.2 |
| 6,325,048 B1 | | 12/2001 | Robinson | |
| 6,343,589 B1 | | 2/2002 | Talaski et al. | |
| 6,629,543 B2 | * | 10/2003 | Kilgore | 137/12 |
| 6,748,964 B2 | * | 6/2004 | Kilgore | 137/14 |
| 2004/0069349 A1 | * | 4/2004 | Wynn et al. | 137/505.25 |

FOREIGN PATENT DOCUMENTS

| | | |
|---|---|---|
| EP | 0636785 A1 | 1/1995 |
| EP | 1106818 A2 | 6/2001 |

* cited by examiner

*Primary Examiner*—Weilun Lo

(57) ABSTRACT

A flow-through pressure regulator includes a retainer that secures a diaphragm relative to a seat, and includes a cylindrical portion, an axial end portion and an annular portion. The cylindrical portion extends about a longitudinal axis and is fixed with respect to the seat. The axial end portion extends from the cylindrical portion and extends generally orthogonal relative to the longitudinal axis. The axial end portion includes a plurality of apertures that permit fluid communication and are selected so as to reduce noise due to fluid flow.

20 Claims, 7 Drawing Sheets

FUEL SYSTEM INCLUDING A FLOW-THROUGH PRESSURE REGULATOR

CROSS REFERENCE TO CO-PENDING APPLICATIONS

This application claims the benefit of the earlier filing date of U.S. Provisional Application No. 60/386,535, filed Jun. 6, 2002, the disclosure of which is incorporated by reference herein in its entirety.

FIELD OF THE INVENTION

This invention relates to a fuel system for an internal combustion engine, and more particularly to a fuel system including a pressure regulator for a vehicle powered by a fuel injected internal combustion engine.

BACKGROUND OF THE INVENTION

Most modern automotive fuel systems utilize fuel injectors to deliver fuel to the engine cylinders for combustion. The fuel injectors are mounted on a fuel rail to which fuel is supplied by a pump. The pressure at which the fuel is supplied to the fuel rail must be metered to ensure the proper operation of the fuel injectors. Metering is carried out using pressure regulators that control the pressure of the fuel in the system at all engine r.p.m. levels.

Fuel flow rate, measured in liters per hour, through known pressure regulators tends to be low at high engine speed, measured in revolutions per minute, as large quantities of fuel are consumed in the combustion process. At low engine speeds, less fuel is consumed in combustion and flow rates through the pressure regulators are high. These high fuel flow rates can produce unacceptably high noise and pressure levels.

According to a known fuel system, as shown in FIG. 8, gasoline is stored in a tank on-board a vehicle. The gasoline is withdrawn from the tank by a pump and fed through a filter to fuel injectors, which deliver the gasoline to combustion cylinders in the engine. The fuel injectors are mounted on a fuel rail to which fuel is supplied by the pump. The pressure at which the fuel is supplied to the fuel rail must be metered to ensure the proper operation of the fuel injectors. Metering is carried out using pressure regulators that control the pressure of the fuel in the system at all levels of engine speed.

A first known pressure regulator, as shown in FIG. 9, includes a spring biased valve seat with a longitudinal flow passage. The longitudinal flow passage, which has a constant cross-section orthogonal to a longitudinal axis, can be modified for length along the longitudinal axis to slightly modify noise and flow performance characteristics.

A second known pressure regulator, as shown in FIG. 10, includes a necked-down longitudinal flow passage and mutually orthogonal cross-drilled holes. The cross-drilled holes disperse fluid flow in a manner that is effective to improve the noise and flow characteristics of the known regulator shown in FIG. 9. However, manufacturing a seat with the necked-down longitudinal flow passage and cross-drilled holes is costly to machine.

It is believed that there is a need for a fuel system that uses a pressure regulator that is less expensive to manufacture and maintains flow-related noise and pressure within acceptable levels, even at high fuel flow rates.

SUMMARY OF THE INVENTION

The present invention provides a fuel system for an internal combustion engine powered by fuel. The fuel system includes a fuel tank adapted to contain the fuel, a pump adapted to withdraw the fuel from the tank and to pressurize the fuel, a pressure regulator, and piping connecting the fuel tank and pump, the piping adapted to supply fuel to the internal combustion engine. The pressure regulator includes a perforated diaphragm-to-seat retainer and provides at least one of generally constant flow-related noise at all fuel flow rates and generally uniform pressure at all fuel flow rates.

The present invention also provides a method of supplying fuel by a pump from a tank to an internal combustion engine. The method includes pumping the fuel under pressure, and regulating fuel flow from the pump. The regulating includes passing the fuel through a diaphragm-to-seat retainer that has been perforated with a plurality of apertures.

BRIEF DESCRIPTION OF THE DRAWINGS

The accompanying drawings, which are incorporated herein and constitute part of this specification, illustrate presently preferred embodiments of the invention, and, together with the general description given above and the detailed description given below, serve to explain features of the invention.

DETAILED DESCRIPTION OF THE PREFERRED EMBODIMENT

Figure 1:
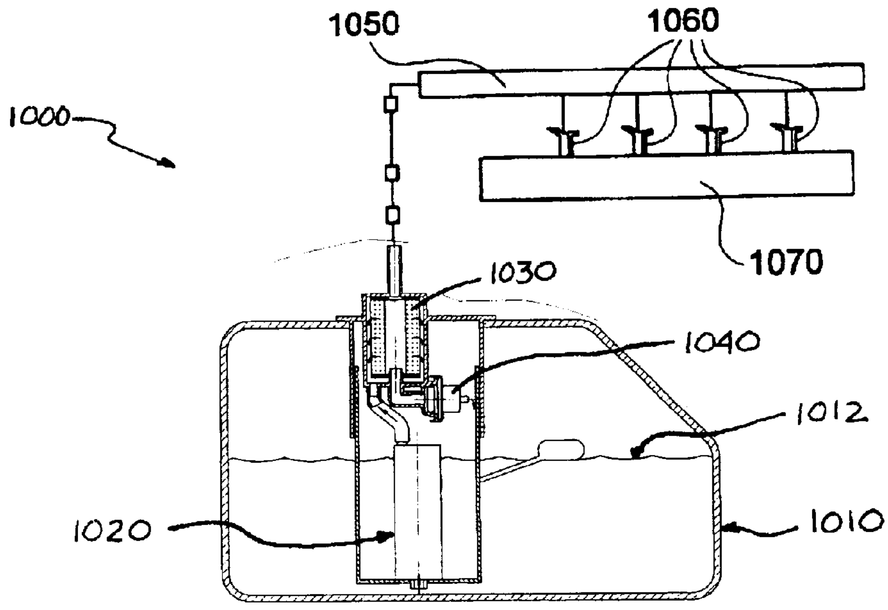
FIG. 1 illustrates a fuel system according to the present invention.
Figure 8:
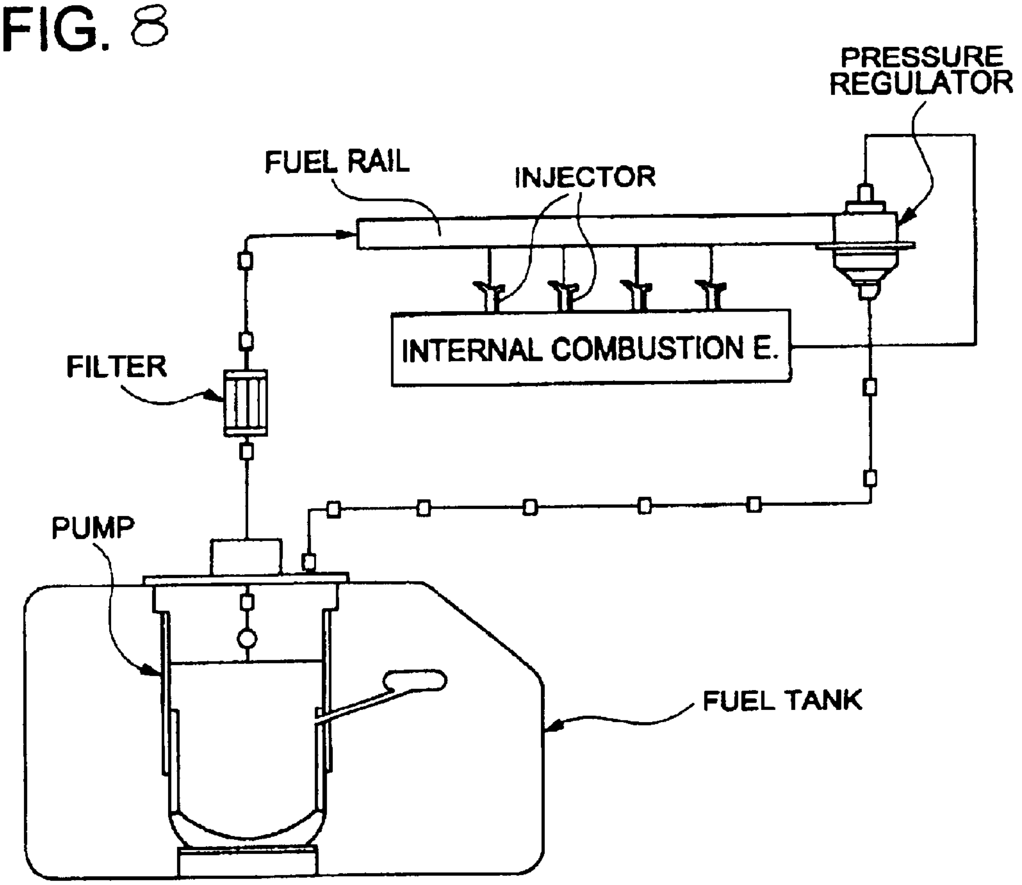
FIG. 8 is a known fuel system.

FIG. 1 illustrates a fuel system 1000 including a tank 1010, a pump 1020, a filter 1030, a pressure regulator 1040, a fuel rail 1050, at least one fuel injector 1060, and an internal combustion engine 1070. Piping as will be described in greater detail below interconnects these components.

The tank 1010 holds fuel 1012. The pump 1020 is shown mounted inside the fuel tank 1010. However, the pump 1020 can also be mounted on the exterior of the tank 1010, or can be remotely-mounted with respect to the tank 1010. The filter 1030 and the pressure regulator 1040 are shown mounted inside the pump 1020. However, the filter 1030 and the pressure regulator 1040, either individually or an integral combination, can also be mounted on the exterior of the pump 1020, or can be mounted remotely with respect to the pump 1020. The tank 1010, pump 1020, filter 1030, and pressure regulator 1040 can be connected by piping such that the fuel 1012 can be filtered in the filter 1030 before entering the pump 1020, or between the pump 1020 and the fuel rail 1050. The pressure regulator 1040 can be connected to a tap in piping between the pump 1020 and the filter 1030, or between the filter 1030 and the fuel rail 1050. Fuel 1012 that is bled off by the pressure regulator 1040 is returned to the tank 1010. The fuel 1012 supplied to the fuel rail 1050 is supplied to each of the injector(s) 1060, and subsequently supplied by the injector 1060 to the engine 1070, e.g., into individual combustion cylinders of the engine 1070.

Figure 2:
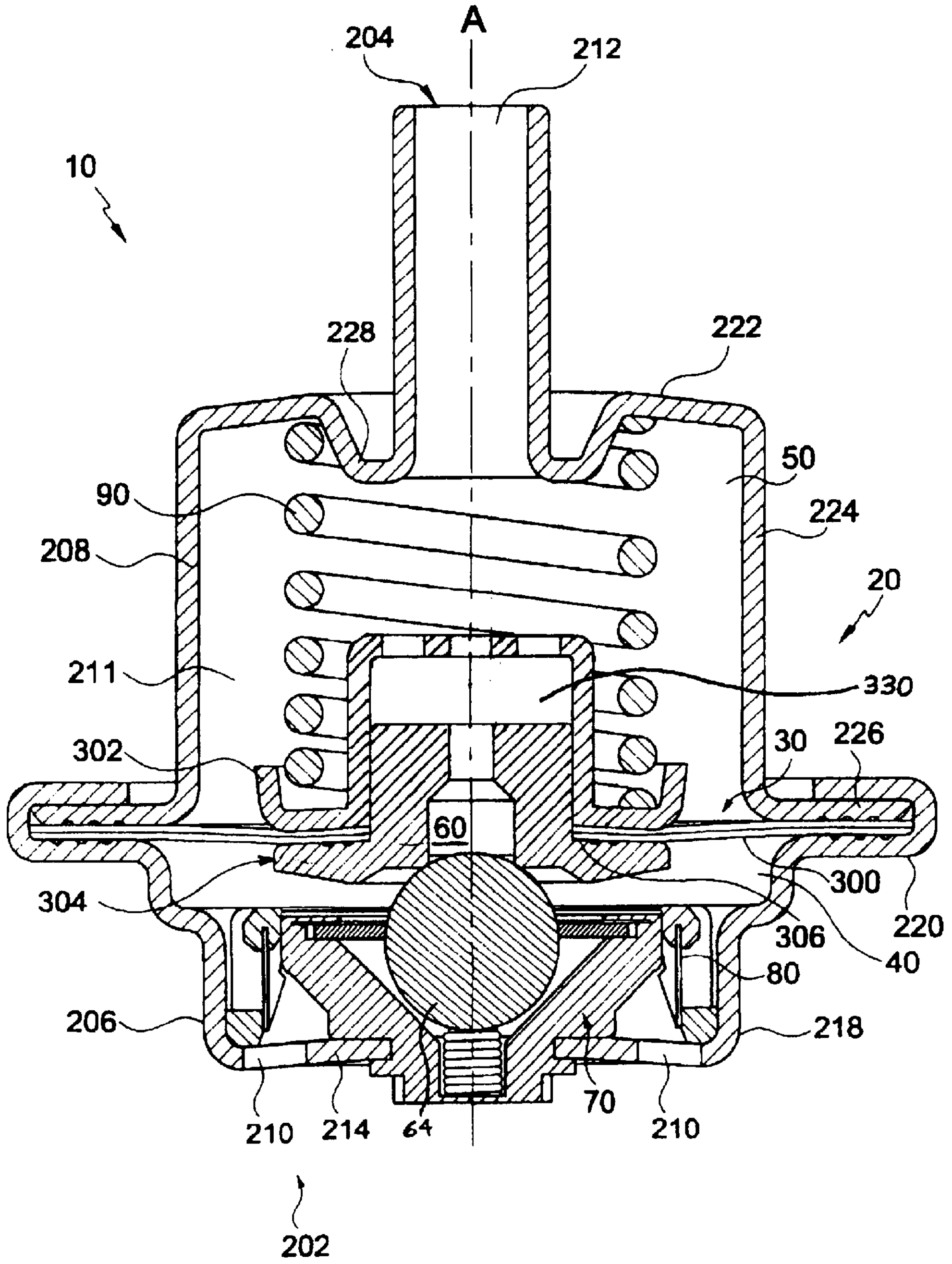
FIG. 2 illustrates a flow-through regulator of the fuel system shown in FIG. 1.

FIG. 2 illustrates a flow-through pressure regulator 1040 according to the present invention. The flow-through pressure regulator 1040 includes a housing 20. The housing 20 is separated by a divider 30 into a first chamber 40 and a second chamber 50. The divider 30 has a passage 60 that communicates the first chamber 40 with the second chamber 50. A closure member 70 permits or inhibits flow through the passage 60. A filter 80 may be disposed in the flow path of the housing 20. The housing 20 has an inlet 202 and an outlet 204 offset along a longitudinal axis A. The housing 20 can include a first housing part 206 and a second housing part 208 that are crimped together to form a unitary housing 20 with a hollow interior 211. Although the unitary housing is formed by two joined members, it is to be understood that the unitary housing could be formed with multiple members integrated together or, alternatively, a monolithic member. The inlet 202 of the housing 20 is located in the first housing part 206, and the outlet 204 of the housing 20 is located in the second housing part 208. The inlet 202 can be a plurality of apertures 210 located in the first housing part 206. The outlet 204 can be a port 212 disposed in the second housing part 208.

The first housing part 206 can include a first base 214, a first lateral wall 218 extending in a first direction along the longitudinal axis A from the first base 214, and a first flange 220 extending from the first lateral wall 218 in a direction substantially transverse to the longitudinal axis A. The second housing part 208 can include a second base 222, a second lateral wall 224 extending in a second direction along the longitudinal axis A from the second base 222, and a second flange 226 extending from the second lateral wall 224 in a direction substantially transverse to the longitudinal axis A. A divider 30, which can include a diaphragm 300, is secured between the first flange 220 and the second flange 226 to separate the first chamber 40 and the second chamber 50. The first flange 220 can be rolled over the circumferential edge of the second flange 226 and can be crimped to the second flange 226 to form the unitary housing 20.

A first biasing element 90, which is preferably a spring, is located in the second chamber 50. The first biasing element 90 engages a locator 228 on the base 222 of the second housing part 208 and biases the divider 30 toward the base 214 of the first housing part 206. The first biasing element 90 biases the divider 30 of the regulator 1040 at a predetermined force, which relates to the pressure desired for the regulator 1040. The base 222 of the second housing part 208 has a dimpled center portion that provides the outlet port 212 in addition to the locator 228. The first end of the spring 90 is secured on the locator 228, while a second end of the spring 90 can be supported by a retainer 302, which is secured to a valve seat 304 mounted in a central aperture 306 in the diaphragm 300.

Figure 3:
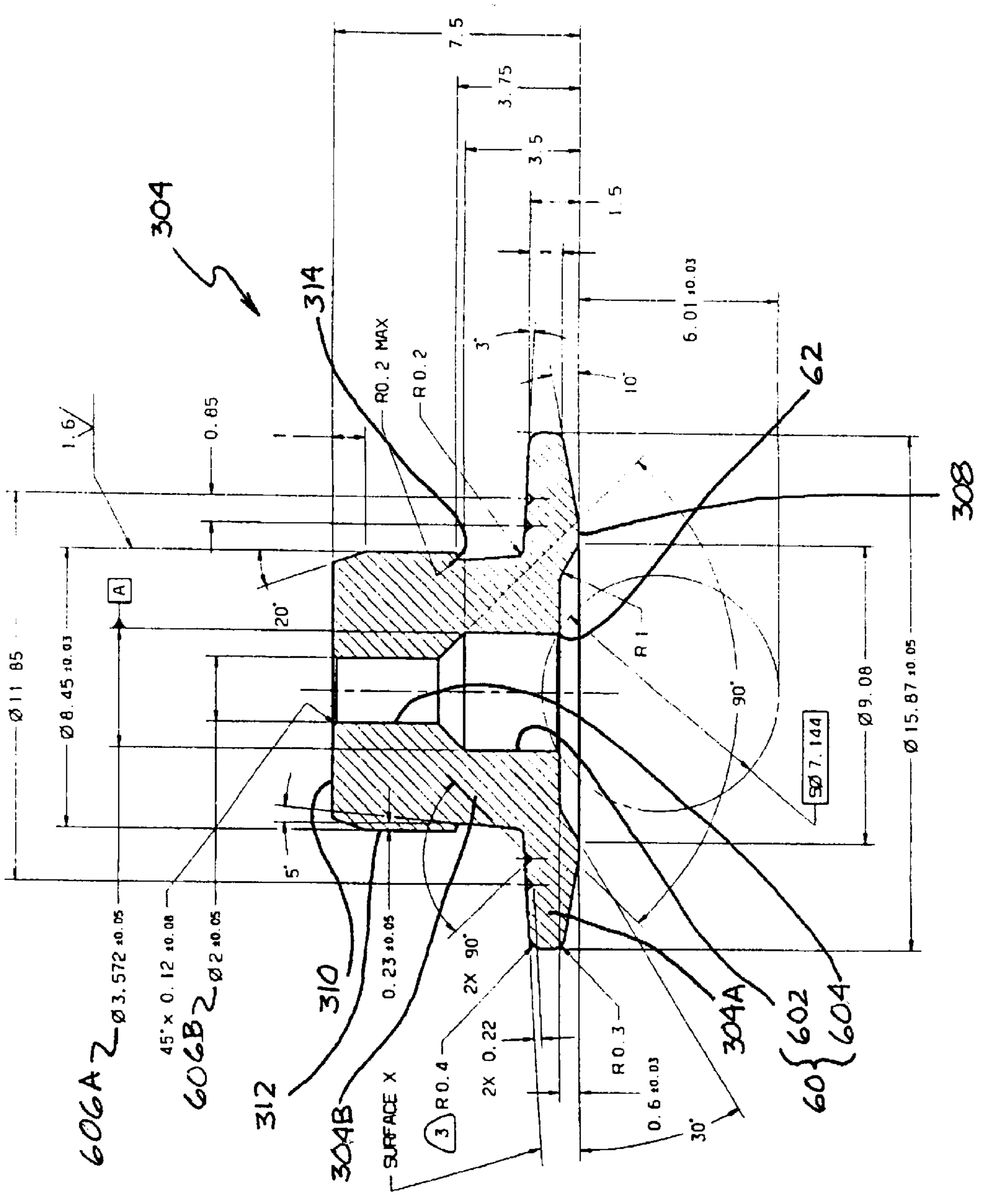
FIG. 3 illustrates a sectional view of the valve seat of the flow-through regulator shown in FIG. 2.

FIG. 3 shows a preferred embodiment of the valve seat 304. The valve seat 304 is suspended by the diaphragm 300 in the housing 20 (FIG. 2), and provides the passage 60 that includes a first section 602 and a second section 604. The valve seat 304 has a first seat portion 304A and a second seat portion 304B disposed along the longitudinal axis A. The first seat portion 304A is disposed in the first chamber 40 and the second seat portion 304B is disposed in the second chamber 50 (FIG. 2). The first section 602 of the passage 60 extends along the longitudinal axis A in both the first portion 304A and the second portion 304B of the valve seat 304. The second section 604, which also extends along the longitudinal axis A, is in the second portion 304B of the valve seat 304.

The valve seat 304 preferably has a first surface 308 disposed in the first chamber 40 (FIG. 2), a second surface 310 disposed in the second chamber 50 (FIG. 2), and a side surface 312 extending between the first surface 308 and the second surface 310. The first section 602 of the passage 60 communicates with the first surface 308. The second section 604 of the passage 60 communicates with the first section 602 and the second surface 310. The first section 602 has a first diameter 606A and the second section 604 has a second diameter 606B that is necked-down from the first diameter 606A, as shown in FIG. 3.

The side surface 312 of the valve seat 304 may include an undercut edge 314 that may enhance the press-fitted connection between the retainer 302 and the valve seat 304.

It should be noted that the valve seat 304 of the present invention can be manufactured as a monolithic valve seat or, alternatively, as separate components that can be assembled. The dimensions illustrated in FIG. 3 are merely exemplary of one preferred embodiment of the valve seat 304.

At an end of the passage 60 opposite the second seat surface 310 is a seating surface 62 for seating the closure member 70, which can be a valve actuator ball 64, as shown in phantom line in FIG. 3. In the manufacturing of the valve seat 304, the seating surface 62 is finished to assure a smooth sealing surface for the ball 64.

Figure 5:
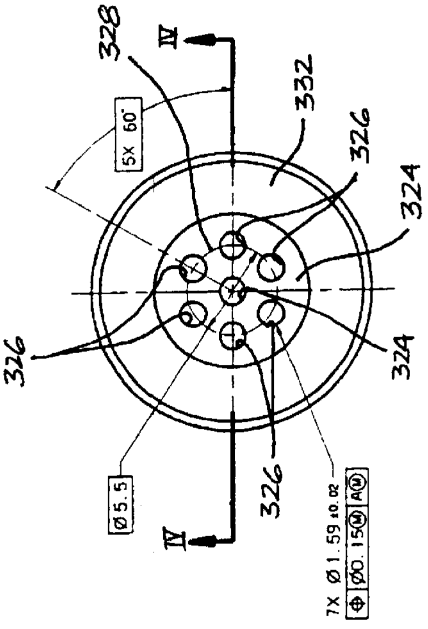
FIG. 5 illustrates a detail view of the retainer shown in FIG. 4.
Figure 4:
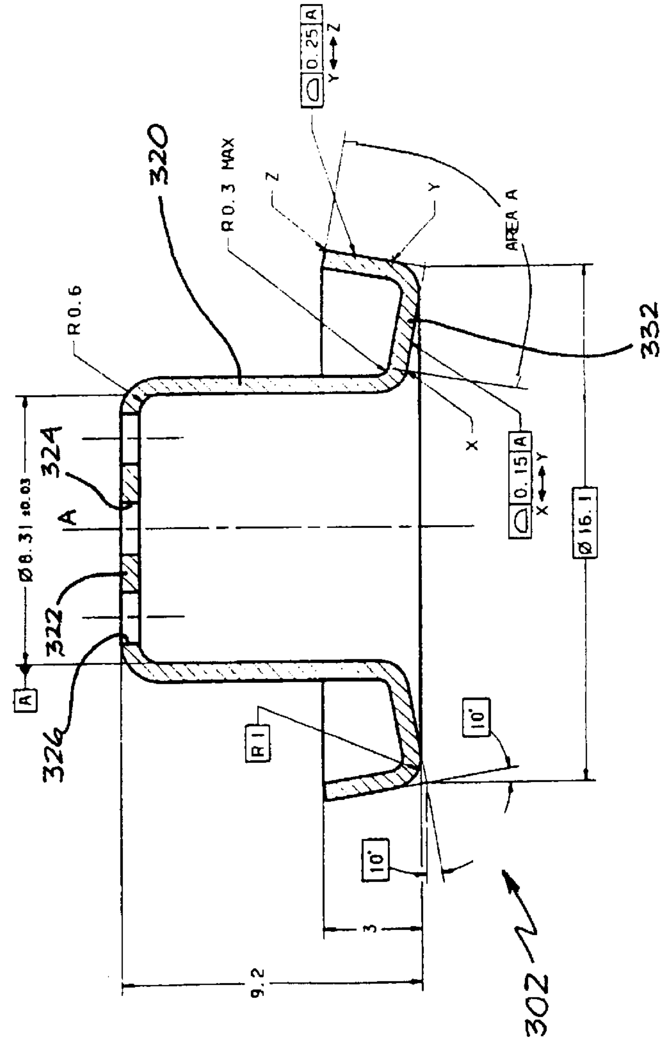
FIG. 4 illustrates a sectional view, taken along line IV—IV in FIG. 5, of the retainer of the flow-through regulator shown in FIG. 2.

FIGS. 4 and 5 show a preferred embodiment of the retainer 302. The retainer 302 includes a cylindrical portion 320 that extends about the longitudinal axis A. According to a preferred embodiment, an inner surface of the cylindrical portion 320 is press-fitted with respect to the side surface 312 of the seat 304, and may cooperatively engage the undercut edge 314.

The retainer 302 also includes an axial end portion 322 that extends from the cylindrical portion 320 in the radially inward direction and orthogonal relative to the longitudinal axis A. The axial end portion 322 includes a plurality of apertures 324,326 through which fluid communication between the passage 60 and the second chamber 50 is permitted.

Referring additionally to FIG. 5, and according to a merely exemplary preferred embodiment with seven apertures, a first aperture 324 is located concentrically with respect to the longitudinal axis A. The six remaining apertures 326 are formed in a circular pattern 328 centered about the longitudinal axis A. According to a most preferred embodiment, each of the apertures 324,326 has a diameter of 1.59±0.02 millimeters, the circle pattern 328 has a diameter of approximately 5.5 millimeters, and six apertures 326 are evenly spaced, i.e., every 60°, about the longitudinal axis A. Additionally, a preferred ratio of the longitudinal thickness of the axial end portion 322 to the diameter of the apertures 324,326 is approximately 0.35.

The inventors have discovered that the noise and flow characteristics through the pressure regulator 1040 are responsive to the number/shape/size of apertures 324,326, the pattern of the apertures 324,326 on the axial end portion 322, and the thickness of the axial end portion 322 that is penetrated by the apertures 324,326. Additionally, the inventors have discovered that providing a collection chamber 330 in the fluid flow between the passage 60 and the apertures 324,326 also improves the noise and flow characteristics through the pressure regulator 1040.

Referring again to FIG. 4, the retainer 302 also includes an annular portion 332 that extends from the cylindrical portion 320 in a generally radially outward direction relative to the longitudinal axis A. The annular portion 332 is spaced along the longitudinal axis A from the axial end portion 322 and, in cooperation with the first seat portion 304A, sandwiches the diaphragm 300, thereby coupling the diaphragm 300 to the valve seat 304. The retainer 302 also serves to support and to locate the second end of the spring 90 with respect to the divider 30.

The dimensions illustrated in FIGS. 4 and 5 are merely exemplary of one preferred embodiment of the retainer 302.

One method of assembling the fuel regulator 1040 is by coupling, such as by staking or press-fitting, the closure member 70 to the first housing part 206. The divider 30 is assembled by locating the valve seat 304 in the central aperture 306 of the diaphragm 300, and then press-fitting the spring retainer 302 with respect to the seat 304 such that the side surface 312 contiguously engages the cylindrical portion 320. The assembled divider 30 is located with respect to the upper flange surface 220 of the first housing part 206. The bias spring 90 is positioned in the spring retainer 302 and the second housing part 208 is then placed over the spring 90. The flange 220 of the first housing part 206 is crimped down to secure the second housing part 208. The first and second housing parts 206,208 and the diaphragm 300 form the first and second chambers 40,50, respectively. The pressure at which the fuel is maintained is determined by the spring force of the bias spring 90.

The operation of the flow-through pressure regulator 1040 will now be described. The bias spring 90 acts through the retainer 302 to bias the divider 30 toward the base 214 of the first housing part 206. When the ball 64 is seated against surface 62, the pressure regulator 1040 is in a closed configuration and none of the supply of fuel 1012 from the tank 1010 can pass through the pressure regulator 1040.

Fuel 102 enters the pressure regulator 1040 through apertures 210 and exerts pressure on the divider 30. When the pressure of the fuel 1012 is greater than the force exerted by the bias spring 90, the diaphragm 300 moves in an axial direction and the ball 64 leaves the seating surface 62 of the valve seat member 304. This is the open configuration of the pressure regulator 1040. Fuel 1012 can then flow through the regulator 1040. From the first chamber 40, the fuel 1012 enters the first section 602 of the passage 60, and then passes into the second section 604 before entering the collection chamber 330. From the collection chamber 330, the fuel passes through the apertures 324,326 into the second chamber 50 before leaving the pressure regulator 1040 through the outlet 204.

As the incoming fuel pressure is reduced, the force of the bias spring 90 overcomes the fuel pressure and returns the valve seat member 304 to seated engagement with the ball 64, thus closing the passage 60 and returning the pressure regulator to the closed configuration.

Experimentation has shown that by designing the apertures 234,236 and/or the collection chamber 330 according to the present invention, a substantially constant noise output level can be achieved from a low fuel flow rate to a high fuel flow rate. Further, the pressure of the fuel 1012 in the regulator 1040 has been found to remain substantially constant or decrease slightly as the fuel flow rate increases from a low fuel flow rate to a high fuel flow rate.

Figure 6:
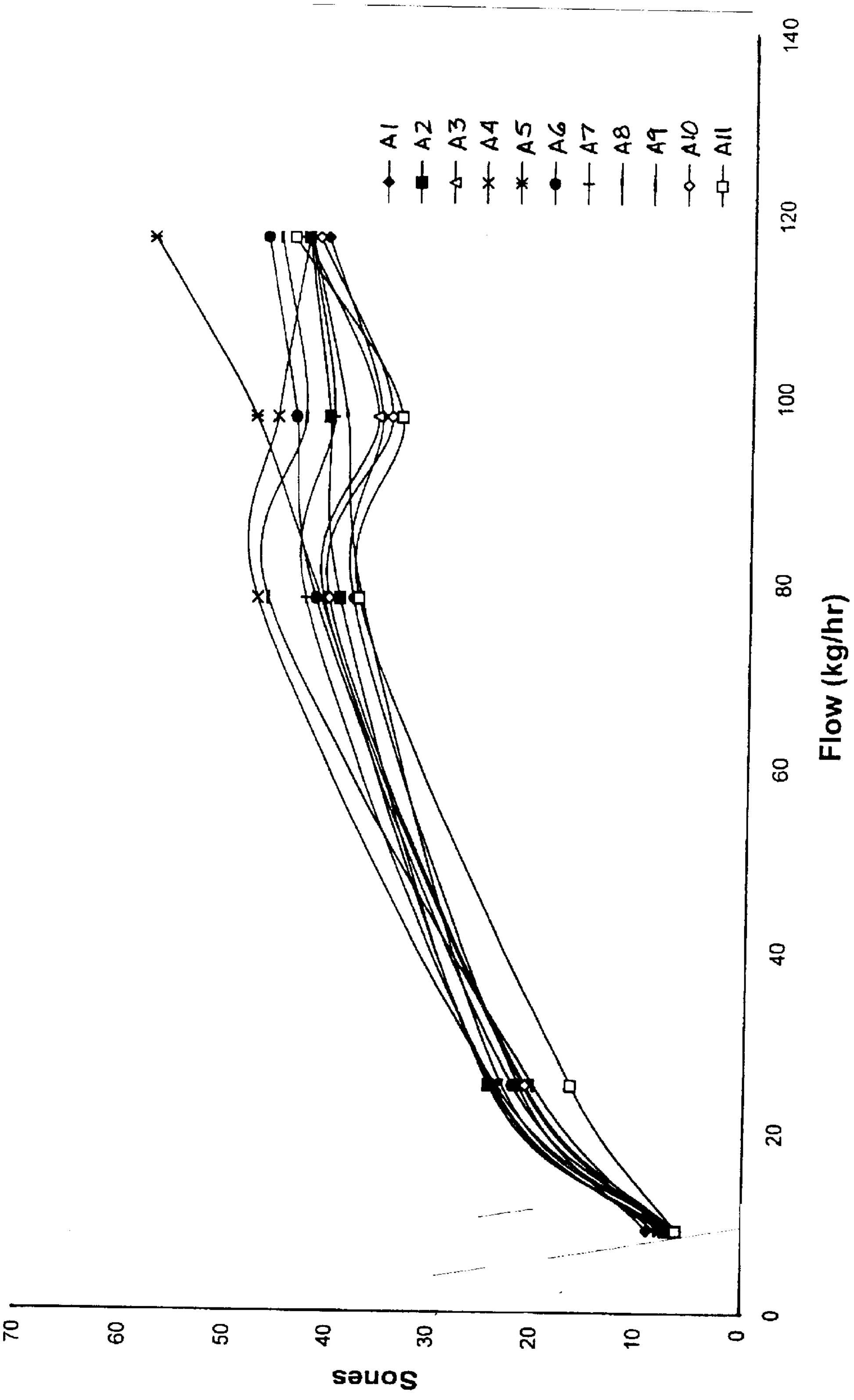
FIG. 6 is a graph illustrating the relationship between noise, measured in Sones, and flow rate, measured in kilograms per hour.

As shown in FIG. 6, curves A3–A7 and A9–A11 show that flow-related noise is kept generally consistent over a range of fuel flow rates using the regulator 1040 of the present invention. The performance of the regulator 1040 is generally consistent with the performance, as illustrated by curves A1, A2 and A8, of known pressure regulators that do not have the advantages of pressure regulator 1040, e.g., ease of manufacture and reduction in cost.

Figure 7:
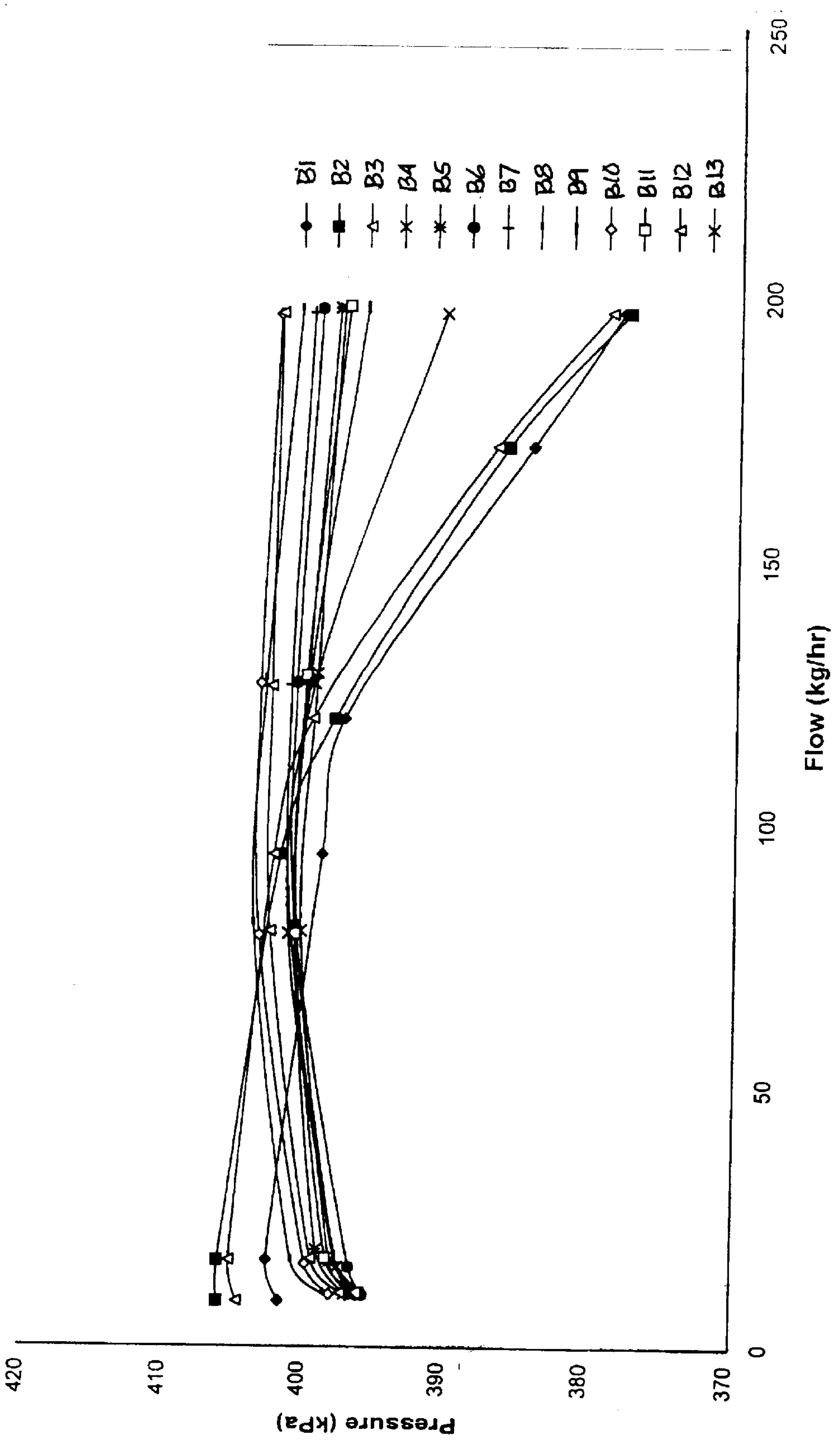
FIG. 7 is a graph illustrating the relationship between pressure, measured in kilopascals, and flow rate, measured in kilograms per hour.
Figure 9:
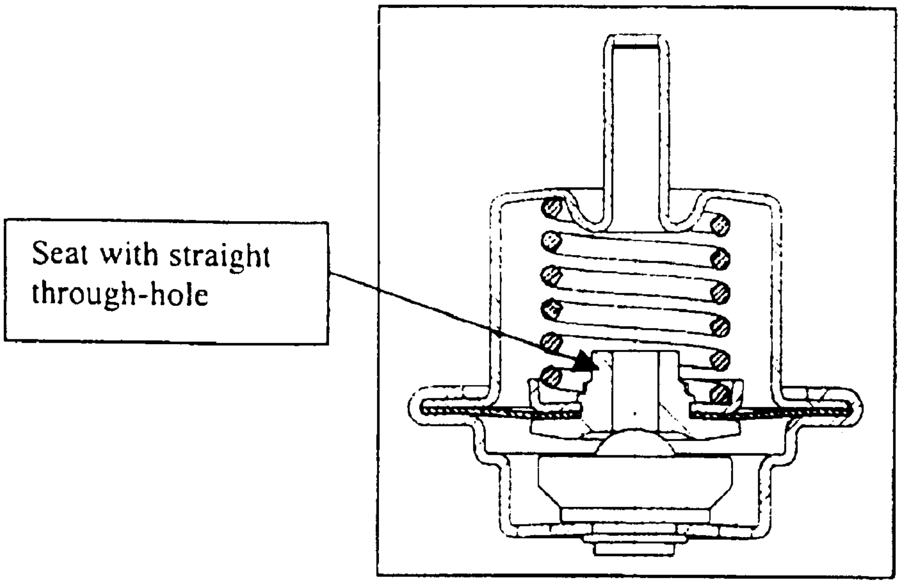
FIG. 9 illustrates a first known pressure regulator.
Figure 10:
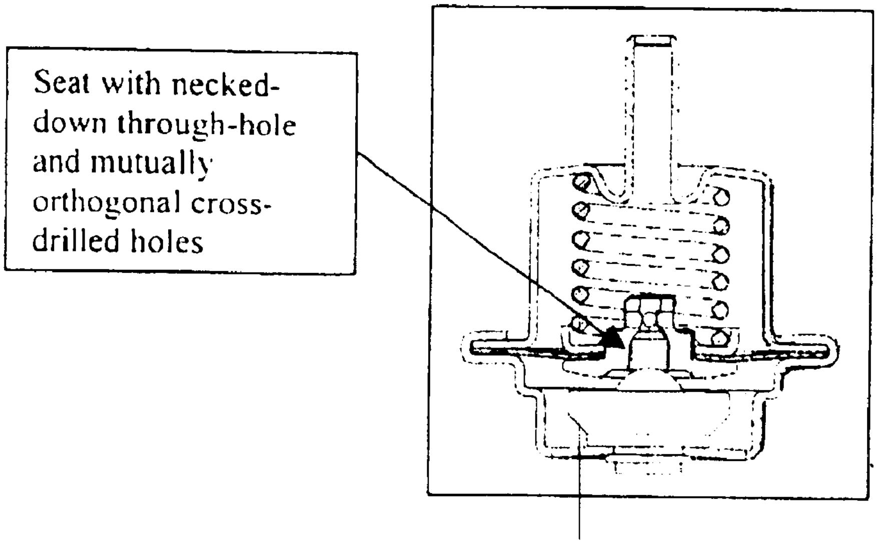
FIG. 10 illustrates a second known pressure regulator.

As shown in FIG. 7, curves B4–B13 show that fuel pressure in the regulator 1040 at the maximum fuel flow rate is substantially equal to or less than the fuel pressure at the minimum fuel flow rate. Again, the performance of the regulator 1040 is generally consistent with the performance, as illustrated by curves B1–B3, of known pressure regulators that do not have the advantages of pressure regulator 1040.

While the invention has been disclosed with reference to certain preferred embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the following claims.

What is claimed is:

1. A fuel system for an internal combustion engine powered by fuel, comprising:

a fuel tank adapted to contain the fuel;

a pump adapted to withdraw the fuel from the tank and to pressurize the fuel;

a pressure regulator including a perforated diaphragm-to-seat retainer disposed along a longitudinal axis, the retainer including a tubular portion extending about the longitudinal axis, and an axial end portion extending from the tubular portion and extending generally orthogonal relative to the longitudinal axis, the axial end portion including a plurality of apertures, the pressure regulator providing at least one of generally constant flow-related noise at all fuel flow rates and generally uniform pressure at all fuel flow rates; and piping connecting the fuel tank and pump, the piping adapted to supply fuel to the internal combustion engine.

2. The fuel system according to claim 1, further comprising:

a filter adapted for filtering the fuel, the filter being interposed in fluid communication between the tank and the internal combustion engine.

3. The fuel system according to claim 2, wherein the filter comprises an in-line filter along the piping.

4. The fuel system according to claim 1, wherein the pressure regulator comprises:

a housing having an inlet and an outlet spaced along the longitudinal axis from the inlet, the inlet receiving a first supply of the fuel from the fuel tank; and the outlet discharging a second supply of the fuel to the piping adapted to supply fuel to the internal combustion engine;

a divider separating the housing into a first chamber and a second chamber, the divider including:

a seat defining a passage between the first and second chambers, fluid communication between the first and second chambers through the passage being permitted;

a diaphragm extending between the housing and the seat, fluid communication between the first and second chambers through the diaphragm being prevented; and the retainer securing the diaphragm relative to the seat, the tubular portion of the retainer including a cylindrical portion extending about the longitudinal axis and being fixed with respect to the seat; and the axial end portion extending from the cylindrical portion and extending generally orthogonal relative to the longitudinal axis, fluid communication between the passage and the second chamber through the plurality of apertures being permitted; and a closure member being arranged between first and second configurations relative to the seat, the first configuration substantially preventing fluid communication through the passage, and the second configuration permitting fluid communication through the passage.

5. The fuel system according to claim 4, wherein the housing comprises first and second housing parts, the first housing part including the inlet and defining the first chamber, and the second housing part including the outlet and defining the second chamber.

6. The fuel system according to claim 5, wherein the diaphragm comprises a first perimeter sandwiched between the first and second housing parts.

7. The fuel system according to claim 6, wherein the retainer comprises an annular portion spaced along the longitudinal axis from the axial portion, the annular portion extending from the cylindrical portion and extending outwardly relative to the longitudinal axis.

8. The fuel system according to claim 7, wherein the diaphragm comprises a second perimeter being sandwiched between the seat and the annular portion of the retainer, and the passage being surrounded by the second perimeter.

9. The fuel system according to claim 7, comprising:

a resilient element extending along the longitudinal axis and biasing the divider toward the closure member, the resilient element including a first end engaging the second housing part and a second end engaging the annular portion of the retainer.

10. The fuel system according to claim 4, wherein the seat, the cylindrical portion, and a longitudinal gap between the seat and the axial end portion of the retainer define a collection chamber in fluid communication between the passage and the plurality of apertures.

11. The fuel system according to claim 4, wherein the cylindrical portion of the retainer being press-fitted with respect to the seat.

12. The fuel system according to claim 4, wherein the passage comprises first and second portions, the first portion includes a first cross-section orthogonal to the longitudinal axis, and the second portion includes a second cross-section orthogonal to the longitudinal axis, the first portion being located between the second portion and the inlet, the second portion being located between the first portion and the outlet, and the first cross-section being larger than the second cross-section.

13. The fuel system according to claim 4, wherein the plurality of apertures comprises a pattern of apertures.

14. The fuel system according to claim 13, wherein the pattern of apertures is centered about the longitudinal axis.

15. The fuel system according to claim 14, wherein the pattern of apertures comprises a circle.

16. The fuel system according to claim 15, wherein the plurality of apertures consists of seven apertures each having a diameter of 1.59±0.02 millimeters, and the circle has a diameter of approximately 5.5 millimeters, a first one of the seven apertures being concentric with the longitudinal axis, and a second, third, fourth, fifth, sixth and seventh ones of the apertures lying on the circle and being evenly spaced about the longitudinal axis.

17. The fuel system according to claim 16, wherein a ratio of a longitudinal thickness of the axial end portion to the diameter of each aperture being approximately 0.35.

18. The fuel system according to claim 4, wherein a number of the plurality of holes, a pattern of the plurality of holes, and a length parallel to the longitudinal axis of the plurality of holes are selected in response to noise and flow characteristics in the second configuration.

19. A method of supplying fuel by a pump from a tank to an internal combustion engine, comprising:

pumping the fuel under pressure; and regulating fuel flow from the pump, the regulating including passing the fuel through a diaphragm-to-seat retainer disposed along a longitudinal axis that has been perforated with a plurality of apertures, the retainer including a tubular portion extending about the longitudinal axis, and an axial end portion extending from the tubular portion and generally orthogonal relative to the longitudinal axis, the axial end portion including the plurality of apertures.

20. The method according to claim 19, wherein the regulating of fuel pressure at a maximum fuel flow rate is substantially equal to or less than the pressure of fuel at a minimum fuel flow rate.

* * * * *